United States Patent Office 2,826,508
Patented Mar. 11, 1958

2,826,508
PORCELAIN REPAIRING METHOD AND COMPOSITION

James E. Giles, deceased, late of Memphis, Tenn., by Gertrude Giles Decker, executrix, Memphis, Tenn.

No Drawing. Application February 6, 1956
Serial No. 563,433

5 Claims. (Cl. 117—2)

This invention relates to repairing damaged porcelain and more particularly to a composition and process for restoring damaged porcelain.

Heretofore it has not been possible to repair damaged places on porcelain at the site of the porcelain object in a simple inexpensive manner so that the repaired portion would not be noticeable and further would adhere to the surface and have similar strength characteristics to the original porcelain.

It is an object of the present invention to provide a method of repairing damaged porcelain which may be accomplished at any location without the necessity for expensive equipment.

It is a further object of the present invention to provide a composition suitable for use in repairing damaged porcelain.

These and other objects and the nature and advantages of the instant invention will be apparent from the following description.

In accordance with the present invention, it has been found that a damaged place in porcelain can be repaired by cleaning the portion to be repaired, applying a particular undercoating to build up the damaged portion, applying a glaze coating on the undercoating, followed by baking the outer coating.

The first step in the process relates to the cleaning of the damaged porcelain object to be repaired. This is preferably accomplished by sanding, but other equivalent methods may be utilized.

The undercoating is next applied. The undercoating consists of a mixture of putty whiting, a baking lacquer paint and a melamine alkyd resin. The baking lacquer paint is added to the putty whiting a little at a time, stirring constantly until the product has a consistency similar to that of taffy. The melamine alkyd resin is then added and the product thoroughly mixed by stirring.

Specific examples of the undercoating are as follows:

Example 1

| | Percent by volume |
|---|---|
| Putty whiting | 65–75 |
| Baking lacquer paint | 15–35 |
| Melamine alkyd resin | 1–10 |

Example 2

| | |
|---|---|
| Putty whiting | 69 |
| Baking lacquer paint | 29 |
| Melamine alkyd resin | 2 |

The proportions of the ingredients may be varied as desired to obtain the consistency desired and those listed above are merely illustrative. Expressed in weight, to approximately a pound of putty whiting is added the lacquer paint until it becomes a pasty consistency. Approximately 3–4 ounces of the melamine alkyd resin may then be added. The addition of the resin does not change the consistency.

The putty whiting is any suitable commercial calcium carbonate chalk.

The baking lacquer paint is a mixture of alkyd resin, melamine resin and a suitable pigment such as titanium dioxide. An example is as follows:

| | Percent |
|---|---|
| Alkyd resin | 52 |
| Melamine resin | 13 |
| Pigment | 35 |

The melamine alkyd resin is a combination of 75% alkyd resin and 25% melamine resin. The alkyd resin is of the soya baking type. A suitable example of alkyd resin is:

| | Percent |
|---|---|
| Soya oil | 40 |
| Glycerol-phthalate resin | 41.6 |
| Thinner (xylol) | 18.4 |

The melamine resin may be any of this type of melamine-formaldehyde resins, such as the melamine resin prepared by Rohm & Haas of Philadelphia, Pennsylvania, under the trade named of Uformite M. M. 55.

The undercoating is applied as necessary to build up the damaged surface and then is allowed to harden for several hours, and when thoroughly hardened, is smoothed down with very fine emery paper and is now ready for the glaze coating.

The glaze outer coating is compounded of baking enamel, melamine alkyd resin, and xylol-resin solution. The melamine alkyd resin is added to the baking enamel and then the xylol-resin solution is added a little at a time until the solution is thin enough for spraying through a spray gun.

Examples of the glaze are as follows:

Example 1

| | Parts by weight |
|---|---|
| Baking enamel | 30 |
| Xylol-resin solution | 25 |
| Melamine alkyd resin | 1 |

Example 2

| | Percent by volume |
|---|---|
| Baking enamel | 65–75 |
| Xylol-resin solution | 15–35 |
| Melamine alkyd resin | 1–10 |

A suitable baking enamel has been obtained from O'Neil-Duro Company identified as Duro, and designated 49-W-1 White Syn Por. It is understood that a suitable baking enamel consists of approximately 30% pigment such as titanium dioxide and 70% varnish made up of 40% alkyd-linseed-soya and 60% mineral spirits.

The alkyd-linseed-soya varnish can be a mixture of 8.3 pounds of phthalic anhydride-glycerol resin per gallon of vehicle (linseed oil and soya fatty acid) heated to a high degree and thinned with xylol.

The melamine-alkyd resin may be the same as the like ingredient in the undercoating.

The xylol-resin solution is a 50% solution of melamine resin and 50% xylol.

Immediately after the glaze is applied, the work is baked with a heating lamp at approximately 300° F. for fifteen minutes. The baking period may have to be increased depending upon the thickness of the object being repaired. Of course, colors or tints are added to the glaze to make it match the object which is being repaired.

The compositions and process outlined herein have given remarkable results in restoring damaged porcelain. The outer glaze coating can be baked on in situ using an infra red lamp. This process is very economical, and simple to use.

It will be obvious to those skilled in the art that various

What is claimed is:

1. A process for repairing damaged porcelain comprising applying an undercoating onto the damaged portion of the porcelain until the damaged surface is built up to the desired shape, allowing said undercoating to harden, applying a glaze outer coating thereon, and baking said glaze outer coating, said undercoating consisting essentially of a mixture of 67–75% whiting, 5.25–12.25% pigment, 2.2–7% melamine resin and alkyd 8.6–25.7% resin, and said glaze outer coating consisting essentially of a mixture of 65–75% alkyd baking enamel, 15.35% of a mixture of xylol and a melamine resin, and 1–10% of a mixture of a melamine resin and an alkyd resin.

2. A process for repairing damaged porcelain comprising applying an undercoating onto the damaged portion of the porcelain, allowing said undercoating to harden, applying a glaze outer coating thereon, and baking said glaze outer coating, said undercoating consisting essentially of approximately 65–75% putty whiting, 15–35% baking lacquer paint and 1–10% melamine-alkyd resin mixture, said baking lacquer paint consisting essentially of 52% alkyd resin, 13% melamine resin and 35% pigment, said melamine-alkyd resin mixture consisting essentially of 75% alkyd resin and 25% melamine resin, said glaze outer coating consisting essentially of approximately 65–75% baking enamel, 15–35% xylol-resin solution and 1–10% melamine-alkyd resin mixture, said baking enamel consisting essentially of 30% pigment and 70% varnish made up of 40% alkyd resin and 60% mineral spirits, said melamine-alkyd resin mixture consisting essentially of 75% alkyd resin and 25% melamine resin, and said xylol-resin solution consisting essentially of 50% melamine resin and 50% xylol.

3. A composition suitable for use as an undercoating for use in repairing damaged porcelain consisting essentially of approximately 65–75% putty whiting, 15–35% baking lacquer paint and 1–10% melamine-alkyd resin mixture, said baking lacquer paint consisting essentially of 52% alkyd resin, 13% melamine resin and 35% pigment, said melamine-alkyd resin mixture consisting essentially of 75% alkyd resin and 25% melamine resin.

4. A composition suitable for use as an outer glaze coating for use in repairing damaged porcelain consisting essentially of approximately 65–75% baking enamel, 15–35% xylol-resin solution and 1–10% melamine-alkyd resin mixture, said baking enamel consisting essentially of 30% pigment and 70% varnish made up of 40% alkyd resin and 60% mineral spirits, said melamine-alkyd resin mixture consisting essentially of 75% alkyd resin and 25% melamine resin, and said xylol-resin solution consisting essentially of 50% melamine resin and 50% xylol.

5. A composition suitable for use as an undercoating for use in repairing damaged porcelain consisting essentially of approximately 65–75% putty whiting, 15–33% baking lacquer paint and 1–10% melamine-alkyd resin mixture, said baking lacquer paint consisting essentially of 52% alkyd resin, 13% melamine resin and 35% pigment, said melamine-alkyd resin mixture consisting essentially of 75% alkyd resin and 25% melamine resin, and as a glaze outer coating approximately 65–75% baking enamel, 15–35% xylol-resin solution and 1–10% melamine-alkyd resin mixture, said baking enamel consisting essentially of 30% pigment and 70% varnish made up of 40% alkyd resin and 60% mineral spirits, said melamine-alkyd resin mixture consisting essentially of 75% alkyd resin and 25% melamine resin, and said xylol-resin solution consisting essentially of 50% melamine resin and 50% xylol.

References Cited in the file of this patent

UNITED STATES PATENTS

| | | |
|---|---|---|
| 2,258,708 | Langkammerer | Oct. 14, 1941 |
| 2,355,474 | Sheperd | Aug. 8, 1944 |
| 2,432,747 | Gilbert | Dec. 16, 1947 |
| 2,542,064 | Tilden | Feb. 20, 1951 |
| 2,574,741 | Hunt | Nov. 13, 1951 |

FOREIGN PATENTS

| | | |
|---|---|---|
| 544,913 | Great Britain | May 4, 1942 |
| 585,879 | Great Britain | Feb. 27, 1947 |